United States Patent
Ioannou et al.

(10) Patent No.: US 7,593,209 B2
(45) Date of Patent: Sep. 22, 2009

(54) MOV FAILURE MODE IDENTIFICATION

(75) Inventors: Stelios Ioannou, Lutz, FL (US); Elias L. Stefanakos, Tampa, FL (US); Paris Wiley, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 12/126,008

(22) Filed: May 23, 2008

(65) Prior Publication Data

US 2008/0218925 A1    Sep. 11, 2008

Related U.S. Application Data

(63) Continuation of application No. PCT/US2006/046131, filed on Nov. 30, 2006.

(60) Provisional application No. 60/740,817, filed on Nov. 30, 2005.

(51) Int. Cl.
*H02H 1/00* (2006.01)
(52) U.S. Cl. .................................. 361/127
(58) Field of Classification Search ............. 361/127
See application file for complete search history.

(56) References Cited

U.S. PATENT DOCUMENTS

| | | | |
|---|---|---|---|
| 3,064,084 A * | 11/1962 | Meacham | ............ 379/361 |
| 4,249,224 A | 2/1981 | Baumbach | |
| 4,636,910 A | 1/1987 | Chadwick | |
| 4,733,175 A | 3/1988 | Levinson | |
| 4,739,436 A | 4/1988 | Stefani et al. | |
| 4,907,119 A | 3/1990 | Allina | |
| 5,621,309 A | 4/1997 | Feldman | |
| 6,211,770 B1 | 4/2001 | Coyle | |
| 6,252,488 B1 | 6/2001 | Ziegler et al. | |
| 6,486,570 B1 * | 11/2002 | Price et al. | ............ 307/105 |
| 2002/0149899 A1 | 10/2002 | Kladar et al. | |
| 2006/0139832 A1 * | 6/2006 | Yates et al. | ............ 361/111 |

OTHER PUBLICATIONS

Strenstrom, L., Lindberg, P. and Samuelsson, J. 1988. "Testing procedure for metal oxide varistors protecting EHV series capacitors." Power Delivery. IEEE. vol. 3. No. 2. pp. 568-583. 1988.

* cited by examiner

*Primary Examiner*—Ronald W Leja
(74) *Attorney, Agent, or Firm*—Ronald E. Smith; Smith & Hopen, P.A.

(57) ABSTRACT

A surge protector includes a thermal fuse, a metal oxide varistor electrically connected in series relation to the thermal fuse, and a detection network electrically connected in parallel relation to the thermal fuse and the metal oxide varistor. A first indicating means indicates whether or not the thermal fuse is in operation and a second indicating means indicates whether or not the metal oxide varistor is in operation.

3 Claims, 7 Drawing Sheets

MOV FAILURE MODE IDENTIFICATION

CROSS-REFERENCE TO RELATED APPLICATIONS

This application is a continuation of prior filed International Application, Serial Number PCT/US2006/046131 filed Nov. 30, 2006, which claims priority to U.S. provisional patent application No. 60/740,817 filed Nov. 30, 2005 which is hereby incorporated by reference into this disclosure.

BACKGROUND OF THE INVENTION

1. Field of the Invention

This invention relates, generally, to surge protection devices. More particularly, it relates to a surge protection device that relies on the capacitive properties of MOV as a part of an impedance network for failure identification.

2. Description of the Prior Art

A metal oxide varistor (MOV) is a device that monitors the proper working of a surge protector. Conventional metal oxide varistor (MOV) failure identification technologies rely on thermal fuses. Conventional surge protectors include thermally protected metal oxide varistors (TMOV) and thermally protected varistor series with indicating lead (iTMOV).

There are numerous surge protection devices currently available. However, until recently, there were no means for indicating whether or not the surge protection device was operated properly. Surge protectors that indicate thermal fuse failure only, for example, may not be operating properly due to MOV failure but no indication is provided to the user that the surge protector has failed. Instead, since the thermal fuse is still intact, the user gets a false indication that the surge protector is still working.

Destruction of an MOV will not affect the normal operation of a surge protector because MOVs are shunt elements. Ironically, poorly designed surge protectors give some indication of destruction by appearing singed, whereas well-designed surge protectors do not appear damaged after destruction.

To avoid a fire hazard, thermal protection schemes are used to prevent the MOV from reaching its thermal destructive level. The use of thermal protective fuses allows the use of LEDs indicating protection and fault operation. Also, it is very important that ground and neutral wires are correctly connected. Since MOVs are surge diverters, if the neutral wire is not connected then the destructive energy cannot be diverted away from the sensitive load.

It is possible that after much surge suppression, the thermal limit of the fuse may not be reached, but the MOV may degrade and fail. Conventional surge protectors do not indicate that such a failed MOV is no longer in service. Such conventional surge protectors will indicate failure only if the thermal fuse has failed.

There is a need for a surge protector design that provides more efficient and safer surge protector circuit operations.

There is also a need for a design that indicates normal and failure modes of MOVs. Such a design would not rely on thermal fuses to identify the presence of an MOV.

However, in view of the prior art taken as a whole at the time the present invention was made, it was not obvious to those of ordinary skill how the identified needs could be fulfilled.

SUMMARY OF THE INVENTION

The long-standing but heretofore unfulfilled need for an improved surge protector is now met by a new, useful, and non-obvious invention.

The novel structure detects operation across both an MOV and a thermal fuse (when present), thus eliminating the possibility a false indication of full protection when an MOV failure has occurred before thermal fuse failure. A thermal fuse can be used in series with an MOV. Such a design would correctly indicate if the MOV fails.

This invention does not rely on thermal fusing for MOV failure identification. It utilizes the capacitive properties of an MOV to be part of an impedance network operating at frequencies other than 60 Hz. At normal operation (no failure), capacitors including MOV will form an impedance network having a voltage drop across them. If the MOV fails as an open circuit then the current in this network is zero. Only open circuit failure is detected because MOVs initially fail as a short circuit but eventually they fail as open circuit, due to continuous conduction. Therefore, the present inventive structure correctly monitors the MOV and notifies the user as to whether or not the MOV is still operational.

These and other advantages will become apparent as this disclosure proceeds. The invention includes the features of construction, arrangement of parts, and combination of elements set forth herein, and the scope of the invention is set forth in the claims appended hereto.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

A suitable MOV failure identification design must be unique and should not rely on thermal fuses. The basic idea behind the present invention is to take advantage of MOV capacitance. Accordingly, the MOV is used as part of a capacitive network that operates at a frequency other than 60 Hz. At normal operation (no failure), capacitors including MOV are impedances having a voltage drop across them. If the MOV fails as an open circuit then the current in this network is zero. Only open circuit failure will be detected because MOVs initially fail as a short circuit but eventually they fail as open circuit, due to continuous conduction.

The utility distribution system impedance as seen by the MOV must first be determined. This is the impedance of a substation transformer, plus the impedance of the transmission line.

For the impedance of the substation transformer, taking a base voltage of 13.8 KV ($V_{base}$=13.8 KV) and complex base power of 16.8 MVA ($S_{base}$=16.8 MVA) gives a base impedance of 11.3357Ω

$$\left(Z_{base} = \frac{V_{base}^2}{S_{base}}\right).$$

In addition, from the nameplate of the transformer, impedance is given as 10.44% per unit or 0.1044 per unit (p.u.). Therefore, actual substation impedance is given by, $Z_{SubActual}=Z_{pu}*Z_{base}$=1.1835Ω. Also for a single phase X/R Ratio=23.76, thus giving X=23.76R.

$Z_{sub}$=R+$jX_L$, giving |$Z_{sub}$|=$\sqrt{R^2+X_L^2}$=1.1835Ω. Solving for this equation, R=0.05657Ω and $X_L$=1.3441Ω. In addition transformer inductance, $$L = \frac{X_L}{2\pi f} = 3.57 \text{ mH}$$

with frequency being 60 Hz.

For the transmission line impedance, assume cable type (105500 1/0). DC resistance given from table A3 [1], $R_{DC, 50°C}$=0.607Ω per mile per conductor=0.377Ω per kilometer per conductor. Furthermore, inductive reactance will be given $$La = 2*10^{-7} \ln\left(\frac{D_{EQ}}{D_S}\right).$$

Figure 1:
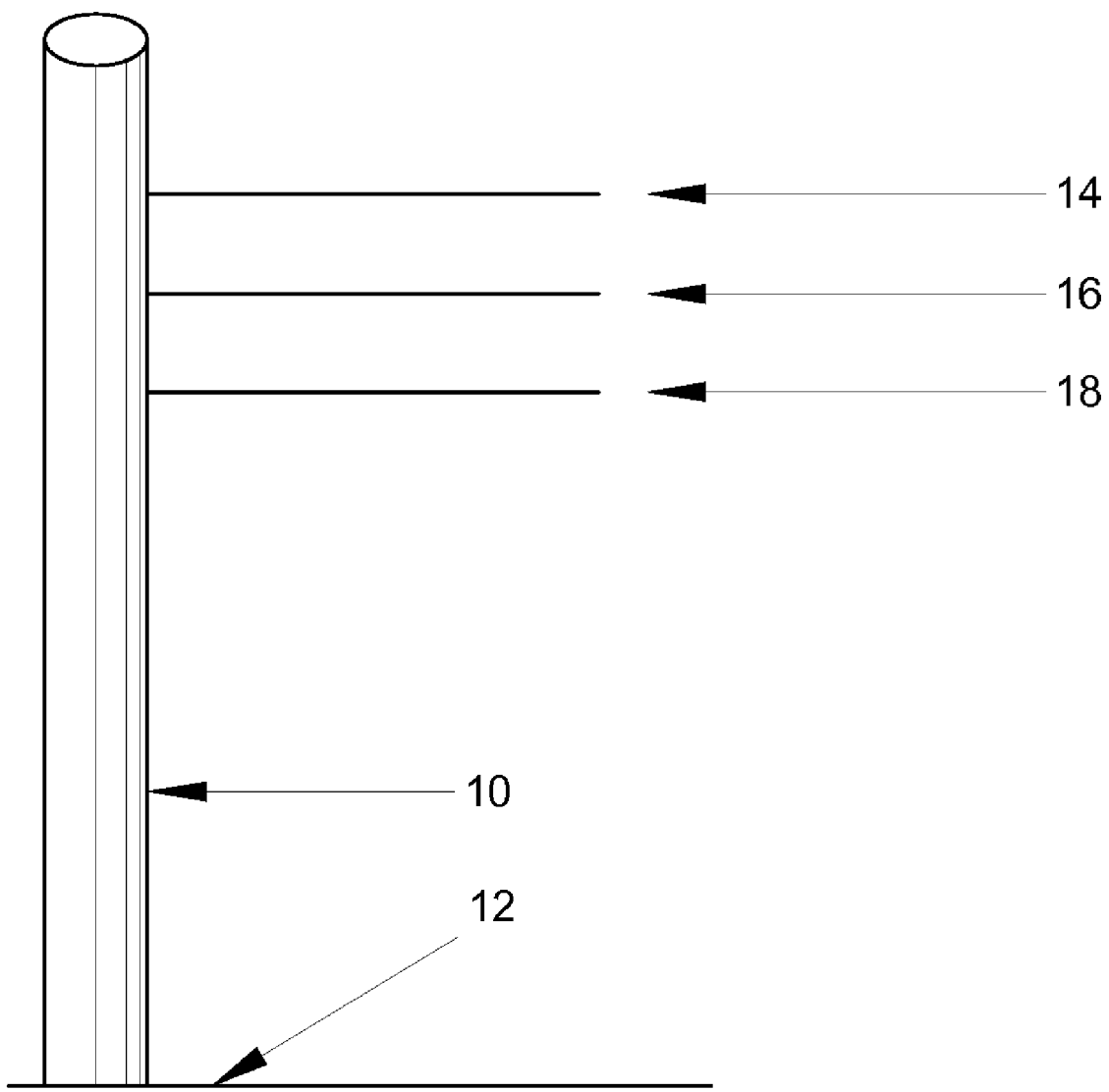
FIG. 1 is a side elevational view of a utility pole.

FIG. 1 depicts an upstanding utility pole 10 and indicates the distances between the three phase conductors. Pole 10 is mounted in ground 12. Phase A is denoted 14 and is seventy four inches (74") from ground. Phase B is denoted 16 and is sixty seven inches (67") from ground. Phase C is denoted 18 and is sixty inches (60") from ground.

$D_S$=Geometric Mean Radius (GMR)=0.01113 feet=3.39*$10^{-3}$ meters (Table A3, [1]).

$$D_{EQ} = \sqrt[3]{D_1 D_2 D_3}$$

Where $D_1$ (7 inches=0.1778 meters) is the distance between phases A and B, $D_2$ (7 inches=0.1778 meters) is the distance between phases B and C, and $D_3$ (14 inches=0.3356 meters) is the distance between phases A and C in meters. The inductive reactance La is therefore equal to 0.838 μH per meter.

Assuming the MOV is connected at 1 km along the transmission line then $Z_{utility}$=(434+j3.571) mΩ. However, this impedance will change as transmission line distance changes.

Figure 2:
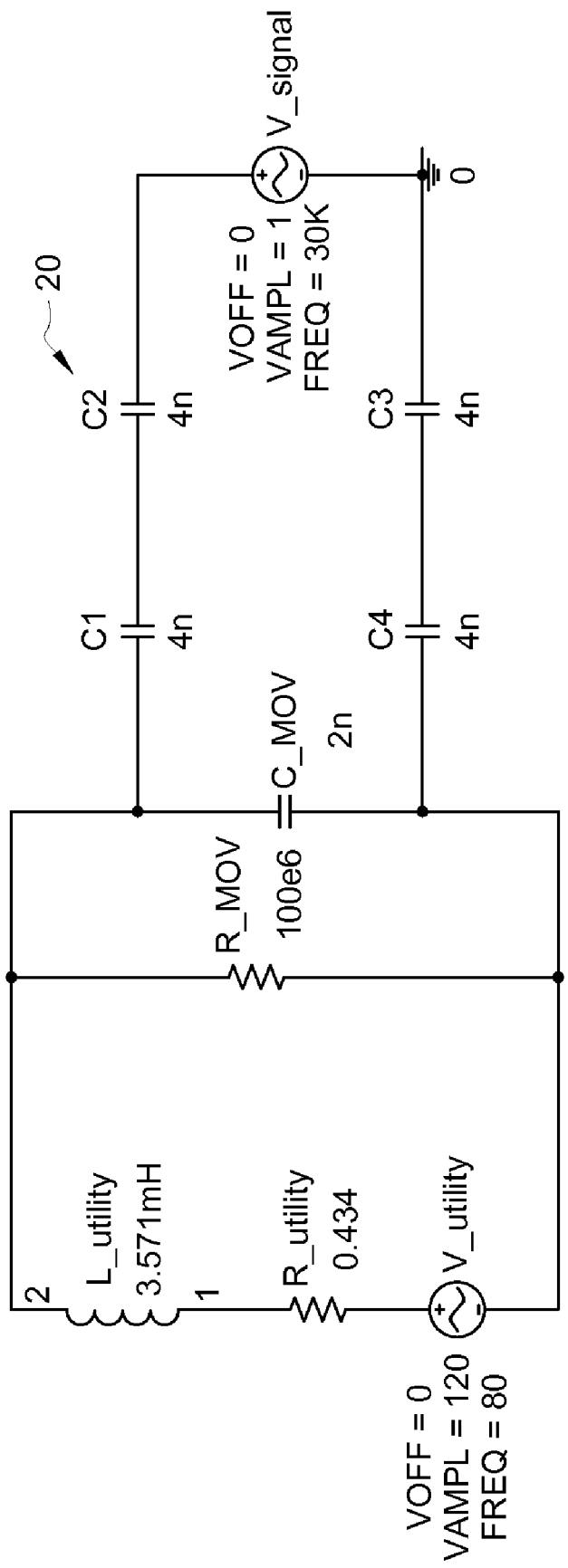
FIG. 2 is a schematic diagram of a preliminary design for MOV failure identification.

FIG. 2 is a concept design for MOV failure identification denoted 20 as a whole.

Figure 3:
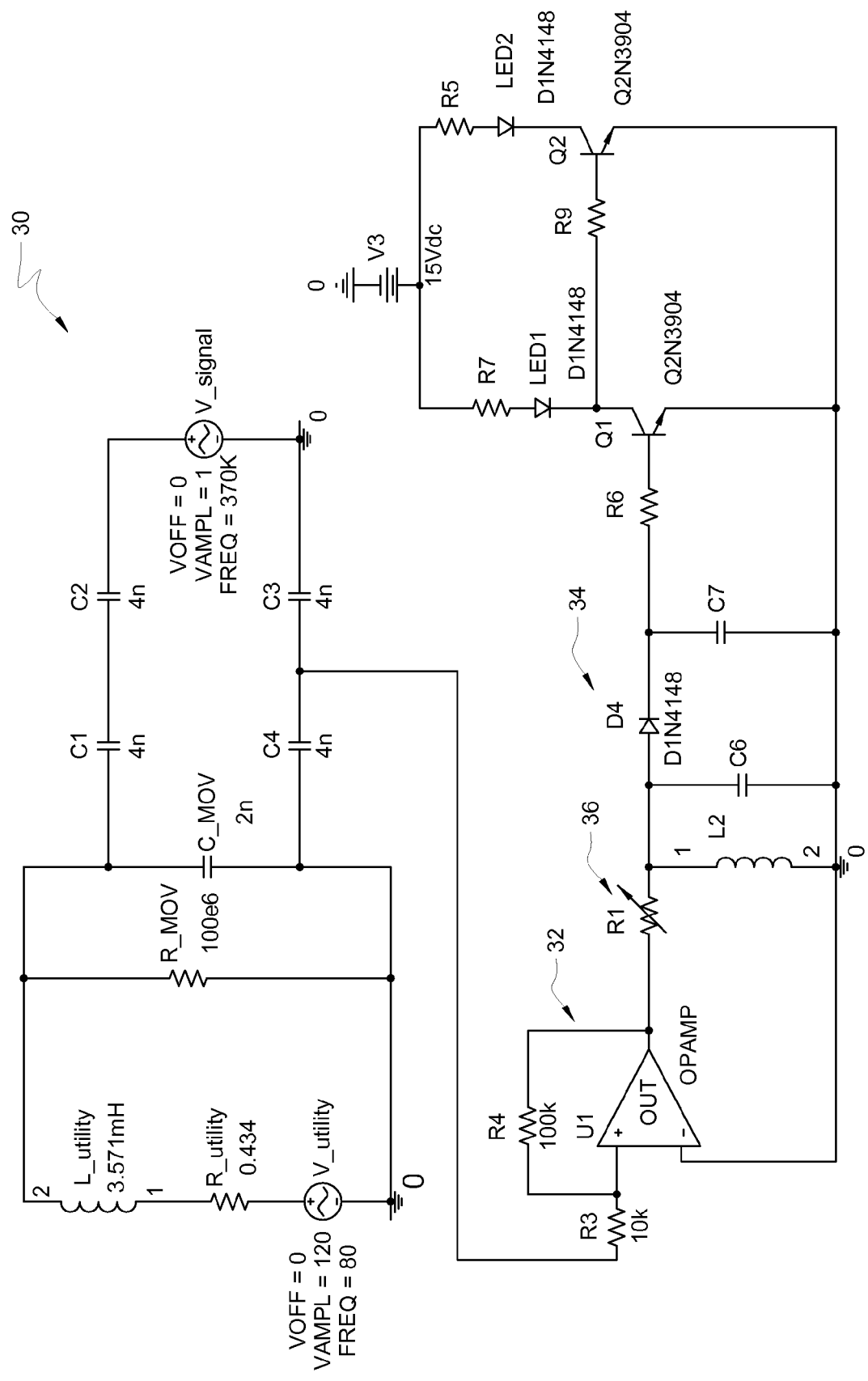
FIG. 3 is a schematic diagram of a preferred design for MOV failure identification.

There is a major problem with the design depicted in FIG. 2. As can be understood from the above values, at 1 km the utility impedance $Z_{utility}$=(434+j3.571) mΩ. At 30 KHz operating frequency, |$Z_{utility}$|=673Ω and |$Z_{MOV}$|=2653Ω, which means that this design will not respond to MOV changes. Therefore, since the inductor impedance is directly proportional to frequency, whereas the capacitor impedance is inversely proportional to frequency, the operating frequency must be increased to 370 KHz, so that $Z_{MOV}$<<$Z_{utility}$. The complete design for MOV failure identification is depicted schematically in FIG. 3 and is denoted 30 as a whole.

The signal at the node of interest is amplified as at 32. The amplifier also serves as high input impedance so that the filter impedance does not affect the rest of the design. After amplification the signal goes though band-pass filter 34 with center frequency of 370 KHz, and Q=18.5. Band-pass filter resistor 36 is a variable resistor, so that it can be adjusted to compensate for parasitic effects and component tolerances. At normal operation $LED_1$ is illuminated and $LED_2$ is off, and when MOV fails as an open circuit, $LED_2$ is illuminated and $LED_1$ turns off.

Figure 4:
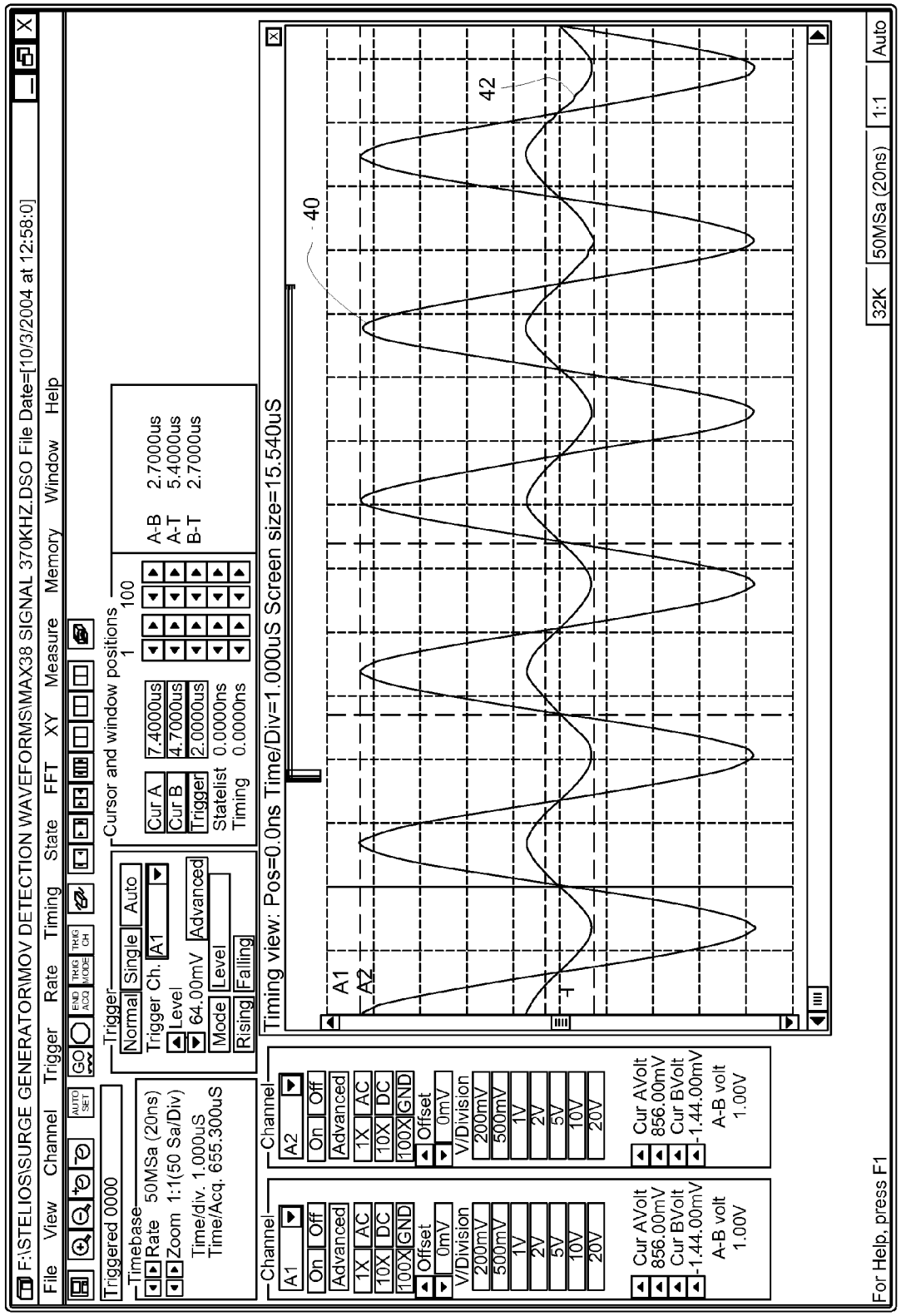
FIG. 4 depicts a first waveform representing the signal from a function generator and a second waveform representing the signal at the recording node indicating normal operation.

FIG. 4 indicates the results. High amplitude waveform 40 is the signal from the function generator and low amplitude waveform 42 is the signal at the recording node representing normal operation.

An illuminated yellow LED represents normal operation. An illuminated red LED represents MOV failure. The selected color of the LED is of course not critical to the invention.

As mentioned above, FIG. 4 depicts two signals. Signal 40 is the signal from the function generator at 370 KHz and 0.86 Vpeak, whereas signal 42 is the voltage at the recording node at 370 KHz and 0.144Vpeak, which indicates normal operation, i.e., protection is available.

Figure 5:
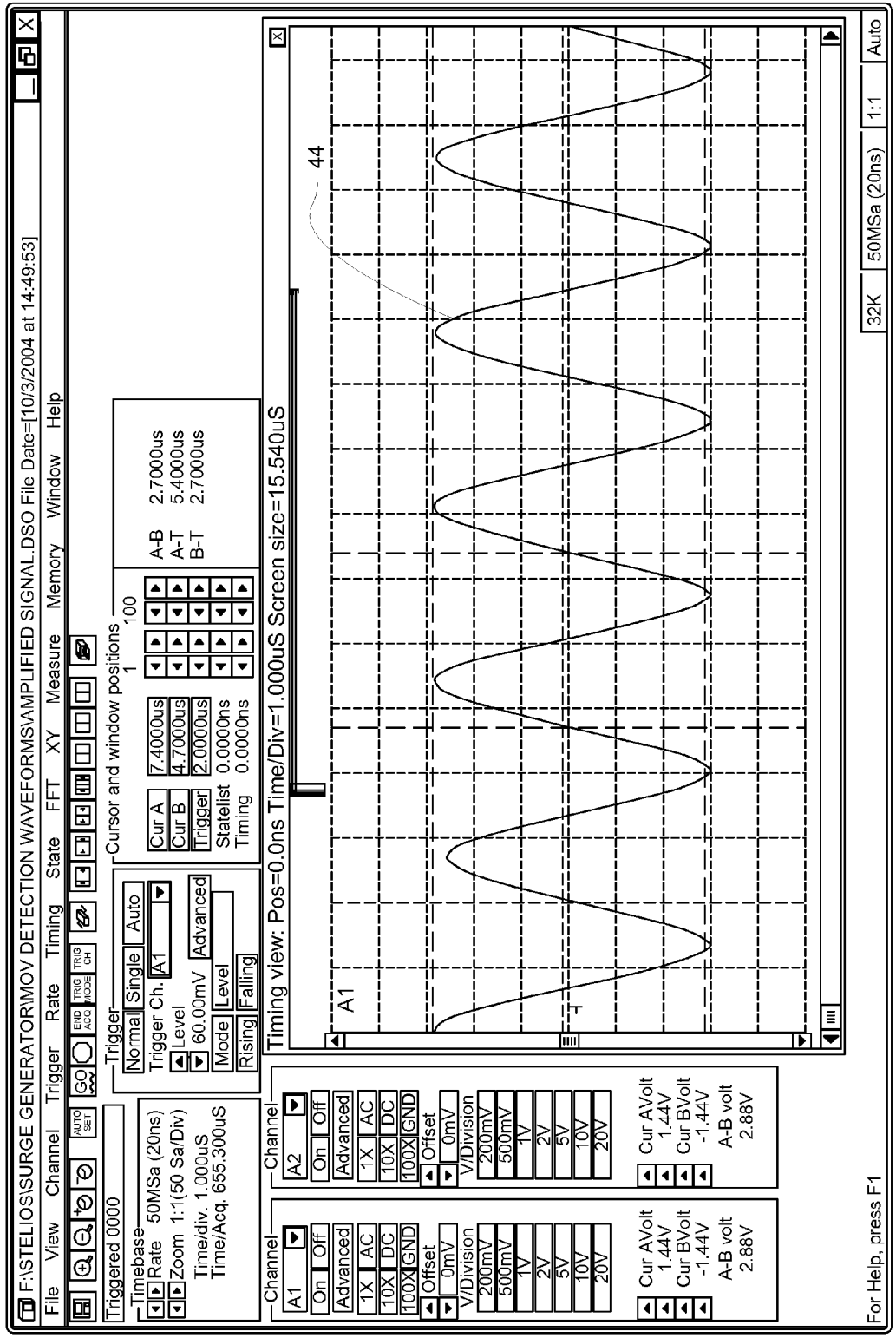
FIG. 5 depicts the recorded voltage amplified to 1.44V peak for normal operation.

FIG. 5 depicts the recorded voltage 44 amplified to 1.44Vpeak for normal operation.

Figure 6:
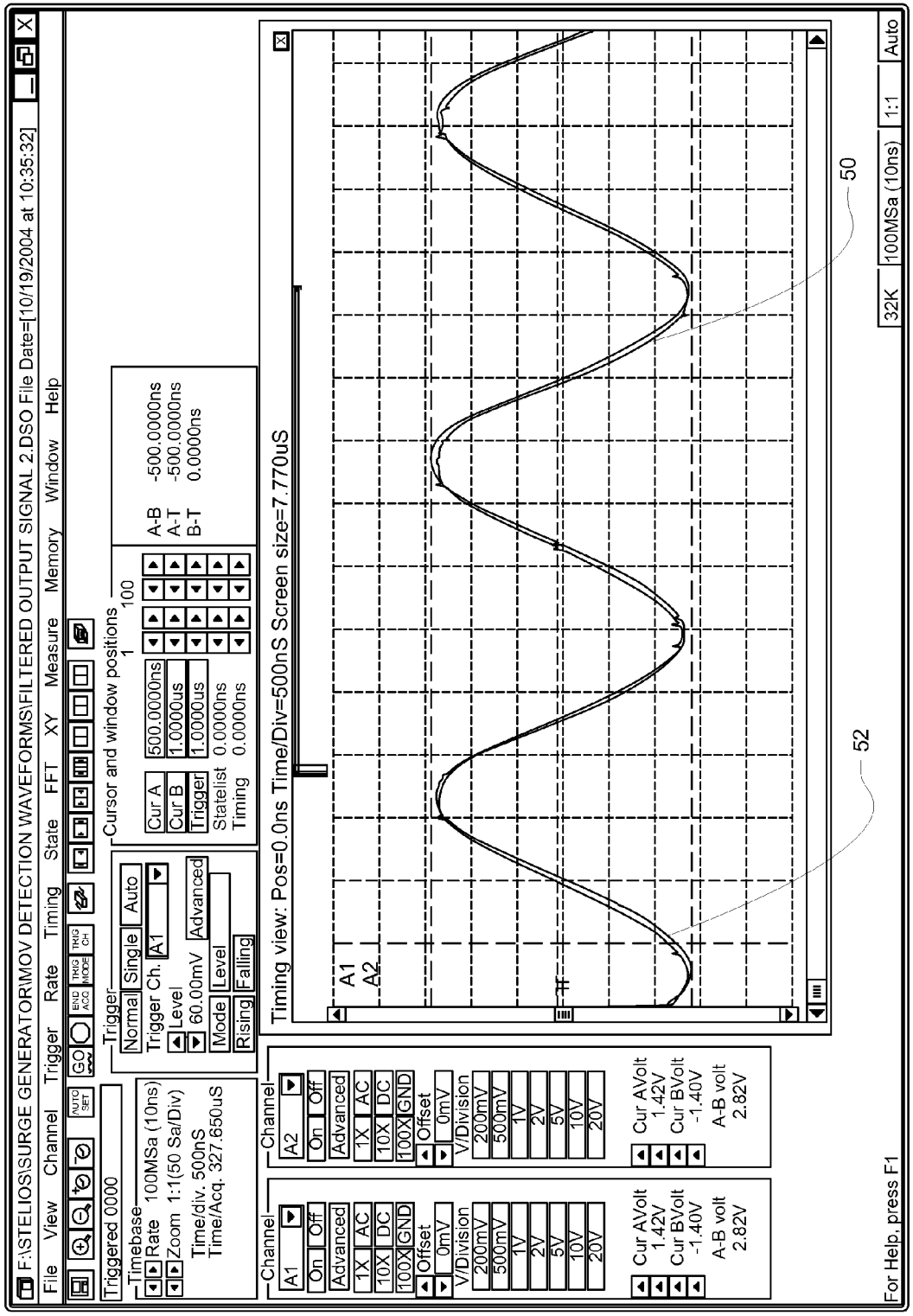
FIG. 6 depicts a first waveform indicating input voltage to a band-pass filter and a second waveform indicating the output from the band-pass filter.

FIG. 6 depicts waveform 50 indicating the input voltage to band-pass filter 34 and waveform 52 indicating the output from said band-pass filter. As depicted, both waveforms are in phase having the same peak values which is an indication of 100% filter efficiency.

In a preferred embodiment of the novel surge protector, normal operation of the surge protector is indicated by an illuminated yellow LED and a red LED that is not illuminated. MOV failure is indicated by illumination of the red LED and non-illumination of the yellow LED. This eliminates the possibility of a false indication that the surge protector is functioning properly.

Figure 7:
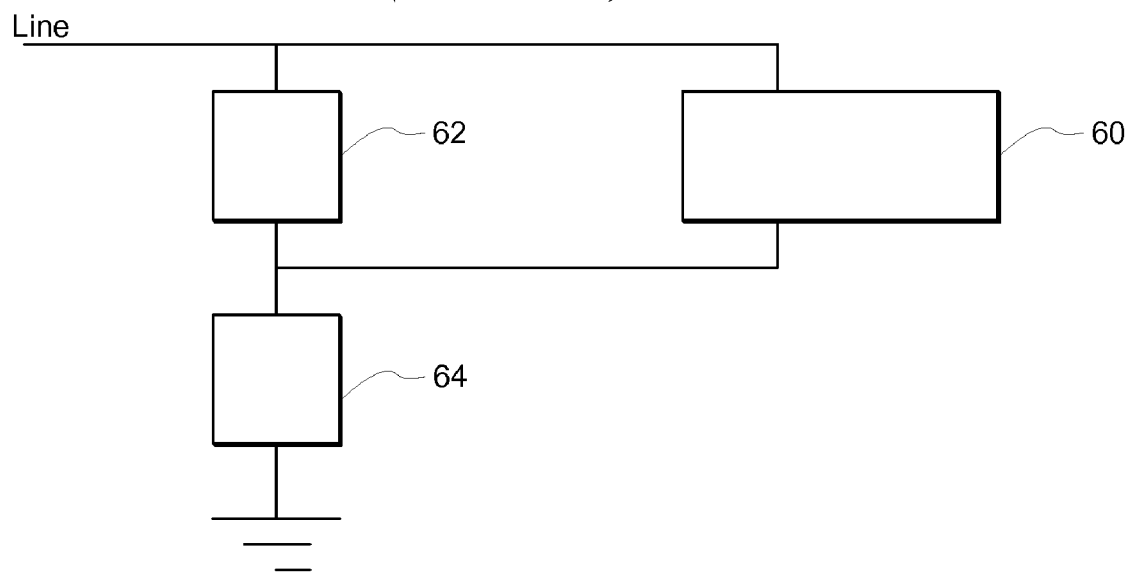
FIG. 7 depicts a prior art thermal fuse, MOV, and detection network.
Figure 8:
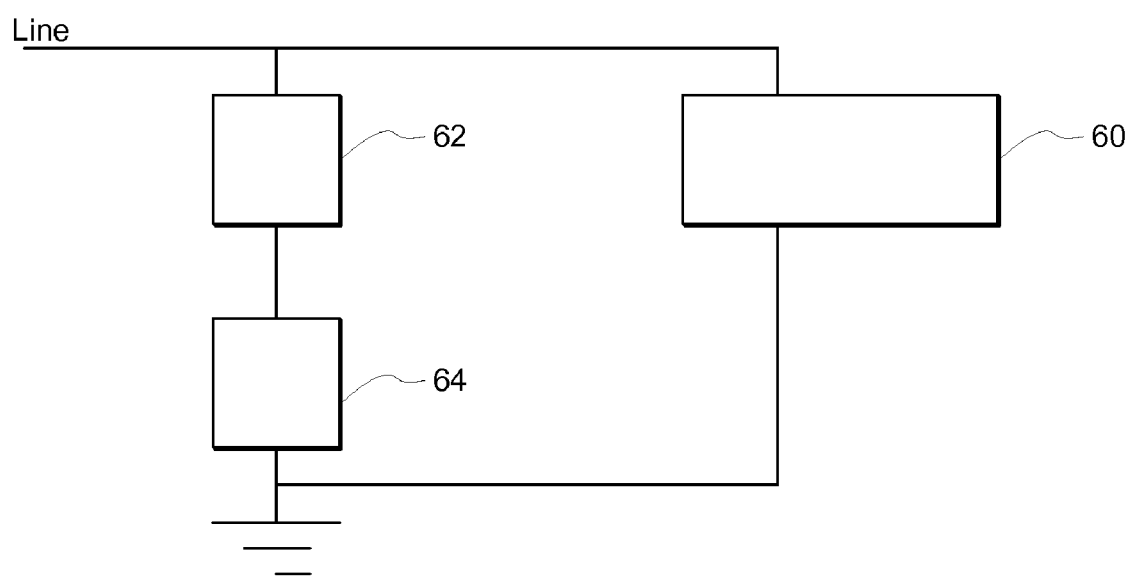
FIG. 8 depicts the thermal fuse, MOV, and detection network of this invention.

FIG. 7 depicts a prior art circuit including detection network 60 electrically connected in parallel relation to thermal fuse 62. FIG. 8 depicts the novel circuit including detection network 60 electrically connected in parallel to thermal fuse 62 and MOV 64.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A surge protector, comprising:
   a thermal fuse;
   a metal oxide varistor electrically connected in series relation to said thermal fuse;
   a detection network electrically connected in parallel relation to said thermal fuse and said metal oxide varistor;

a first indicating means for indicating whether or not said thermal fuse is in operation: and a second indicating means for indicating whether or not said metal oxide varistor is in operation.

2. The surge protector of claim 1, further comprising:

said first indicating means being a first LED that is illuminated when the thermal fuse is in operation; and said second indicating means being a second LED that is illuminated when the metal oxide varistor is not in operation.

3. A surge protector for protecting electrical equipment from surges from a utility, comprising:

a single metal oxide varistor;

a function generator having a preselected operating frequency so that an absolute value of impedance of said single metal oxide varistor is less than an absolute value of said utility impedance;

an impedance network including a plurality of capacitors and said metal oxide varistor that operates at frequencies other than 60 Hz;

said plurality of capacitors being electrically connected in parallel relation to said metal oxide varistor;

said plurality of capacitors and said single metal oxide varistor forming an impedance network having a voltage drop across said plurality of capacitors and said single metal oxide varistor when said surge protector is in normal operation;

said impedance network having zero current if said single metal oxide varistor fails, said failed single metal oxide varistor then representing an open circuit.

* * * * *